US005899064A

United States Patent [19]

Cheung

[11] Patent Number: 5,899,064

[45] Date of Patent: May 4, 1999

[54] SERVO-ACTUATOR WITH FAIL SAFE MEANS

[75] Inventor: Shek Michael Cheung, Chandler, Ariz.

[73] Assignee: AlliedSignal Inc., Morristown, N.J.

[21] Appl. No.: 08/948,809

[22] Filed: Oct. 9, 1997

Related U.S. Application Data

[60] Provisional application No. 60/027,541, Oct. 15, 1996.

[51] Int. Cl.[6] .......... F16D 31/02

[52] U.S. Cl. .......... 60/406; 91/363 A; 91/387; 91/461

[58] Field of Search .......... 60/403, 406; 91/360, 91/363 A, 386, 387, 461

[56] References Cited

U.S. PATENT DOCUMENTS

| | | | |
|---|---|---|---|
| 2,886,009 | 5/1959 | Myers | 91/363 A X |
| 2,886,010 | 5/1959 | Hayos et al. | 91/363 A X |
| 2,973,013 | 2/1961 | Myers | 91/363 A X |
| 3,362,296 | 1/1968 | Gray et al. | 91/387 X |
| 3,390,613 | 7/1968 | Westbury et al. | 91/387 X |
| 4,374,485 | 2/1983 | Lattuada | 91/387 |
| 4,412,670 | 11/1983 | Card et al. . | |
| 4,534,273 | 8/1985 | Vanderlaan . | |
| 4,624,284 | 11/1986 | Lembke | 91/387 X |
| 4,809,733 | 3/1989 | Hawkins . | |
| 4,864,210 | 9/1989 | Dantlgraber . | |
| 5,117,633 | 6/1992 | Byer et al. . | |
| 5,150,876 | 9/1992 | Pickard . | |

*Primary Examiner*—Hoang Nguyen
*Attorney, Agent, or Firm*—Robert Desmond, Esq.

[57] ABSTRACT

The present invention provides a servo-actuator capable of operating in both the Fail Safe and Fail Operate modes. In the Fail Safe mode, a pretensioned spring member moves a jet pipe in the servo-valve to cause said actuator rod to move in a first direction upon loss of electric power. A mechanical feedback means coupled to said spring member and said actuator rod opposes the force applied by the spring so that when a force equilibrium is reached the actuator rod will be at a predetermined position.

7 Claims, 2 Drawing Sheets

SERVO-ACTUATOR WITH FAIL SAFE MEANS

REFERENCE TO COPENDING APPLICATION

This application claims the benefit of U.S. Provisional Application No.: 60/027,541 filed Oct. 15, 1996.

TECHNICAL FIELD

This invention relates generally to servo-actuators, and more particularly, to a servo-actuator having a novel, closed loop Fail Safe means.

Servo-hydraulic actuators are well known in the aerospace field and are used for a variety of applications such as to provide vectoring of a rocket's exhaust nozzle or to move control surfaces aboard an aircraft. As typically configured, an actuator system includes a servo-valve to control the flow of hydraulic fluid from a hydraulic pump to the actuator and from the actuator to a reservoir. The actuator includes a linearly variable displacement transducer (LVDT) for sensing the position of the actuator rod. A signal generated by the LVDT indicative of actuator rod position is transmitted to an electronic control unit for use in generating a command signal to be transmitted to the servo-valve.

These servo-actuators drive components that are critical to the flight capability of the aircraft or rocket. Generally, the actuators are designed to operate in two failure modes referred to as Fail Operate mode and Fail Safe also referred to as Fail Fix mode. In the Fail Operate mode the position of the actuator rod is driven by the external load to which it is connected. The philosophy behind this mode is to avoid damages to linkages or components and thus the position of the actuator rod is allowed to vary as the load varies. In some failure situations, it is necessary that the actuator rod move to a fixed predetermined position. This is the Fail Safe mode. FIG. 1 shows a prior art actuator 2 comprising an actuator rod 4 mounted in a housing 6 configured for Fail Safe operation by including a midstroke port (PMID) 8 in the housing 6. When Fail Safe mode is required the servo-valve is deenergized which results in opening PHEAD and PROD to the supply and venting PMID to the return. This causes the actuator rod 4 to move to, and stay at, its predetermined mid-stroke position.

Disadvantages associated with this prior art Fail Safe device are: (1) A mid-stroke port PMID needs to be drilled in the actuator housing. (2) During normal operating mode, the high pressure piston dynamic seal has to slide over this mid-stroke port and may be cut by the sharp edges of the port. (3) Once the mid-stroke port is drilled into the housing, the Fail Safe predetermined position cannot be altered. (4) The mid-stroke port must be shaped accordingly to achieve stability.

Accordingly, there is a need a servo-actuator with Fail Safe means that overcomes the disadvantages associated with the prior art.

SUMMARY OF THE INVENTION

In view of the above, it is an object for the present invention to provide a servo-actuator having a Fail Safe means that overcomes the disadvantages associated with the prior art.

The present invention achieves this object by providing servo-actuator having a pretensioned spring member that in the Fail Safe mode moves a jet pipe in the servo-valve to cause the actuator rod to move in a first direction. A mechanical feedback means coupled to said spring member and said actuator rod opposes the force applied by the spring so that when a force equilibrium is reached the actuator rod will be at a predetermined position.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
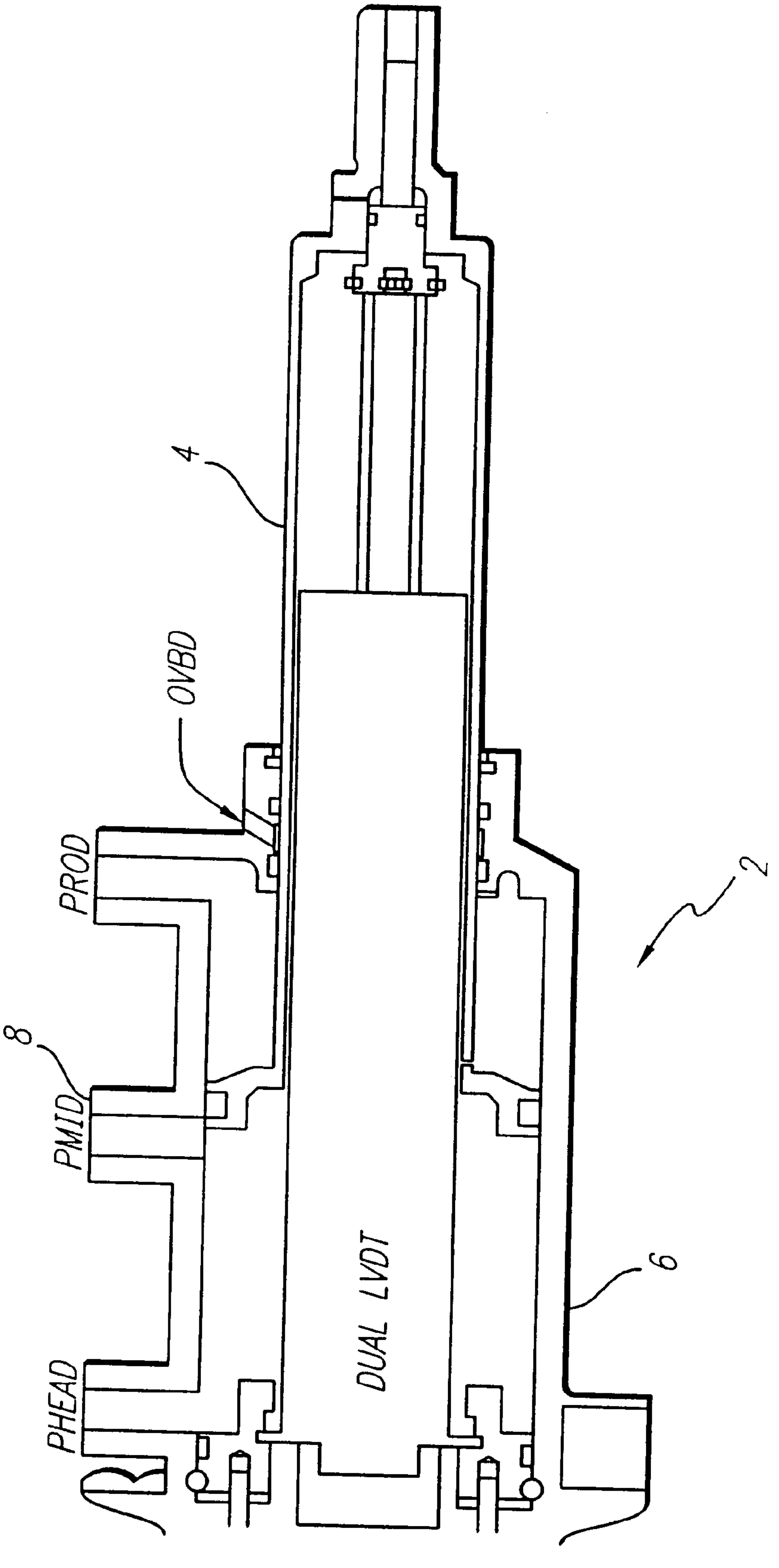
FIG. 1 is a schematic of a prior art actuator.
Figure 2:
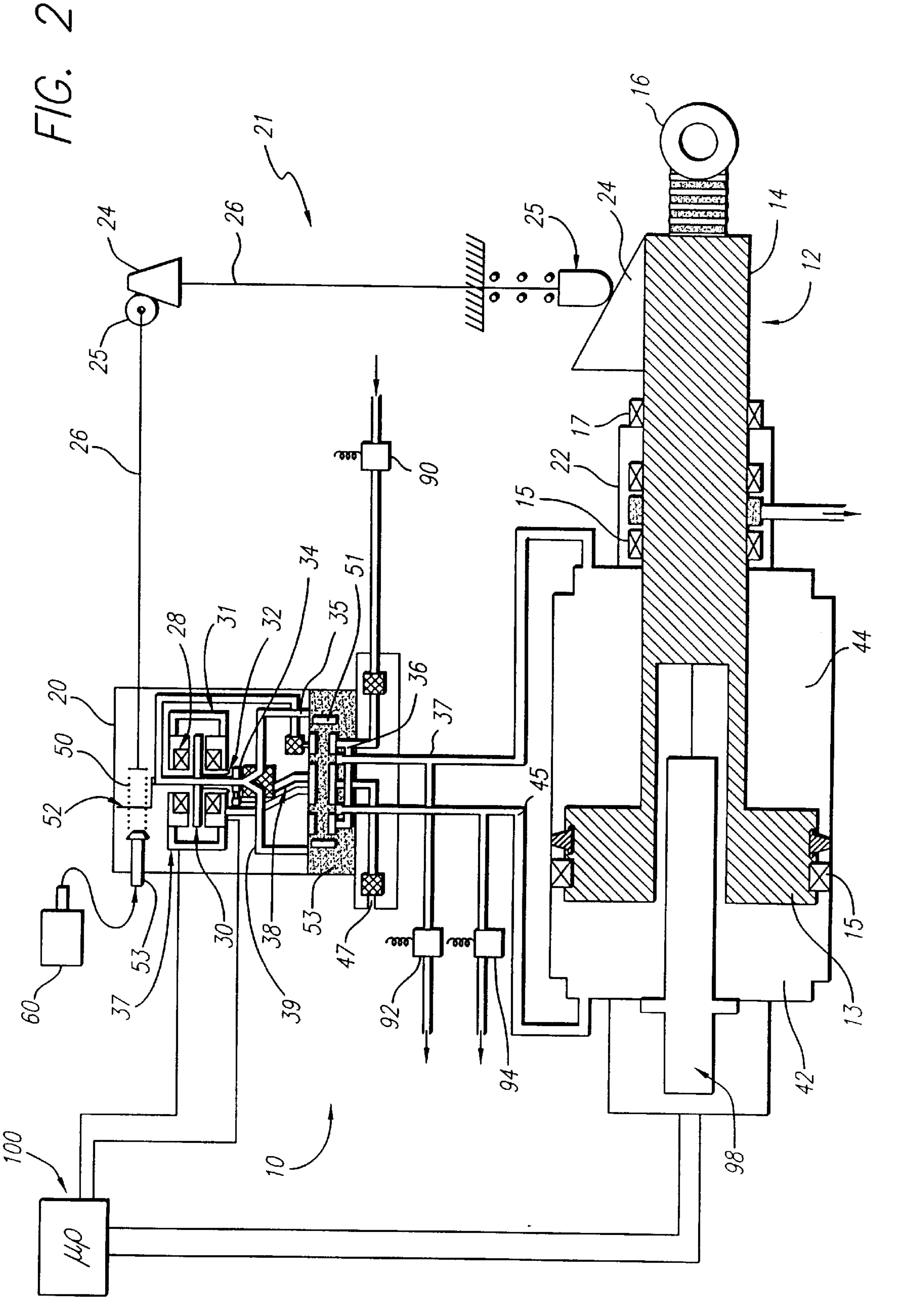
FIG. 2 is a schematic of a servo-actuator with Fail Safe operation as contemplated by the present invention.

Referring to FIG. 2, a servo-actuator generally indicated by reference numeral 10 and includes a two stage electro-hydraulic servo-valve 20 connected by conduits 37 and 45 to a linear hydraulic actuator 12. The hydraulic actuator 12 includes an actuator rod 14, a rod end 16 connectable to an external member to be actuated, and an uneven area piston 13 integral with the rod 14 and received in an actuator housing 22. Housing 22 includes dynamic seals 15 and scraper seals 17. Piston 13 defines a head chamber 42 and a rod chamber 44 within housing 22. Head chamber 42 is connected to conduit 45 and rod chamber 44 is connected to conduit 37. A linearly variable displacement transformer (LVDT) 98 is mounted within housing 22 for sensing the position of actuator rod 14 and transmitting a signal indicative of rod position to an electronic control unit, such as a conventional microprocessor 100.

The position of actuator rod 14 is controlled by the servo-valve 20. The Servo-valve 20 includes a spool valve 36, and a torque motor 37 comprising a rotatable armature 30 and coil 28 mounted within a magnet/frame pole piece assembly 31. A flexible jet pipe 32 in fluid communication with a source of pressurized supply fluid is mounted to armature 30. Jet pipe 32 is positioned such that pressurized fluid is expelled therefrom through a jet orifice 34 and then enters one or both of conduits 35 and 39 leading to spool valve 36. Conduit 35 is connected to the retract chamber 51 of spool valve 36 and conduit 39 is connect to the extend chamber 53 at the opposite end. Spool valve 36 is in fluid communication with actuator 12 through conduits 37 and 45.

For normal actuator retract operation, the servo-valve 20 accepts through coil 28 an electrical position error command from the electronic control unit. As the electrical current is passing through the coil assembly 28 under the presence of magnetic forces of the pole piece assembly 31, a torque is created to pivot the armature 30. Pivoting of the armature 30 causes the jet pipe 32 to be deflected accordingly and direct the flow of pressurized fluid from jet pipe 32 into conduit 35, and to the retract chamber 51 of spool valve 36. In response thereto, the spool valve 36 moves to the left (facing FIG. 2), causing pressurized supply fluid to flow through conduit 37 to the rod chamber 44 which causes the rod 14 to retract and expel fluid from the head chamber 42 into the conduit 45. The movement of the valve 36 also causes conduit 45 to vent to a return pressure 47.

The position of the spool valve 36 is mechanically fed back to armature 30 through a feedback spring 38 so as to oppose the torque-motor induced movement of jet orifice 34 toward conduit 35, and thereby slow the movement of the valve 36. Motion of the spool valve 36 will stop once a force balance between the torque motor armature 30 and the feedback spring 38 is achieved.

For normal activator extend, mode is the reverse of the normal retract mode. In the deploy mode, an opposite electrical current causes armature 30 to deflect jet pipe 32 so as to align orifice 34 with conduit 39 leading to extend chamber 53 of spool valve 36. Responsive motion of spool valve 36 causes pressurized supply fluid to flow through conduit 45 to head chamber 42 causing actuator rod 14 to extend and expel fluid from rod chamber 44 through conduit 37 now vented to the return pressure 47.

The servo-actuator 10 is further equipped with a mechanical actuator position feedback system generally denoted in the drawing by numeral 21. Preferably the position feedback system 21 comprises a system of cams and followers 24, 25, and linkage members 26 for feeding back movement of actuator rod 14 to armature 30 in servo-valve 20. A cam follower 25 is spring loaded in rolling or sliding contact against a cam 24 integral with rod 14 and defining a tapered surface thereon. Cam follower 25 is mounted so as to track the tapered surface of cam 24 upon movement of rod 14 relative thereto, causing follower 25 to translate in a direction perpendicular to the motion of rod 14. The motion of follower 25 is then transmitted to servo-valve 20 through linkages 26 which may include additional cams and followers 24, 25, or alternatively bellcranks (not shown), for obtaining the desired location and direction of motion of linkages 26. The linkages 26 are connected to the armature 30 through an adjustable torque summer spring 50 and a coupling 52.

In the event of a loss of electrical signal to the servo-valve, (either intentionally or not) the actuator moves to a predetermined Fail Safe position. The jet pipe 32 is mechanically biased toward conduit 35. Without the influence of the armature torque, the bias of jet pipe 32 will cause the actuator to retract. As the actuator rod 14 is retracting and moving cam 24, feedback system 21 provides a force feedback through linkages 26 to the armature through the torque summer spring 50. The tension force exerted by linkage 26 on the torque summer 50 causes coupling 52 to bias the jet pipe 32 away from conduit 35 and toward conduit 39. Gradually, the linkage 26 and jet pipe 32 reach an equilibrium whereupon the movement of the actuator rod 14 stops reaching the predetermined Fail Safe position. It should be noted that the foregoing description assumes that the actuator rod 14 is initially extended beyond the Fail Safe position. The reverse operation would occur in the event the actuator rod 14 were retracted beyond the Fail Safe position.

Although the mechanical feedback system 21 is only useful in the event of electrical failure, it continuously operates, affecting the normal electro-hydraulic servo-valve controlled operating mode. The load applied to jet pipe 32 by the linkages 26 is always counter to the torque being applied by torque-motor 15. Consequently, the torque-motor 15 is sized large enough to enable it to override the effect of the mechanical feedback system 21 through linkages 26. The electronic control unit takes into account the influence of the mechanical system 21 on the jet pipe 32 and compensates the command signal to torque motor 15 accordingly.

An advantage to the present invention is that a predetermined position of the actuator rod can be obtained in the event of loss of electric power. This is accomplished by calibrating the torque summer 50 as follows. A tension load is placed on rod end 16. Then manual adjustment screw 53 is used to change the spring tension in the torque summer 50 until the desired Fail Safe position of the actuator rod 16 is obtained. The adjustment screw 53 is then lock-wired and sealed.

This approach provides a single Fail Safe mode for a specific external disturbance load. An alternative embodiment of the present invention provides for multiple Fail Safe predetermined positions. This embodiment includes a five wire hybrid stepper motor 60 with detent torque capability can be used to trim the adjustment screw 53 in flight. An electric motor can be used in lieu of the stepper motor 60 to provide a analogue Fail Safe operation.

In Fail Operate mode, pilot solenoid valve 90 is commanded closed and pilot solenoid valves 92 and 94 are commanded open by the electronic control unit. Head chamber 42 and rod chamber 44 are vented to return allowing the external load to drive the position of the rod 14.

Various modifications and alterations of the above described servo-actuator will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A servo-actuator with Fail Safe means comprising:

an actuator having a rod for coupling to a member requiring actuation, said rod being capable of movement between a retracted first position and a second position;

an electronic control unit;

a servo-valve comprising a torque motor, a jet pipe, a spool valve, and a first plurality of conduits, said first plurality of conduits providing fluid communication between said jet pipe and said spool valve;

said torque motor operatively attached to said jet pipe and said electronic control unit, said torque motor being capable of receiving a signal from said electronic control unit and in response thereto exerting a first force acting on said jet pipe;

a primary feedback transducer, said primary feedback transducer providing a signal to said electronic control unit in response to the movement of said rod; and a secondary feedback linkage, said secondary feedback linkage comprising a mechanical linkage operatively attached to said jet pipe to provide a second force acting on said jet pipe, said second force input being substantially proportional to the movement of said actuator;

said first force and said second force combining into a net force capable of deflecting said jet pipe to cause a first flow of fluid from said jet pipe to be directed into one of said first plurality of conduits, said first flow of fluid causing said spool valve to open to allow fluid communication between a source of hydraulic pressure and an inlet of said actuator, whereby said actuator moves said rod between said first and second position.

2. The servo actuator of claim 1, wherein:

said primary feedback transducer is a linear variable differential transformer.

3. The servo actuator of claim 2, wherein:

said secondary feedback linkage comprises a first spring operatively coupled between said actuator rod and said jet pipe.

4. The servo actuator of claim 3, further comprising:

a second spring operatively coupled to said first spring so as to provide a third force substantially opposite to said second force acting on said jet pipe, said first, second, and third forces cooperating to produce a net force capable of deflecting said jet pipe to cause a first flow of fluid from said jet pipe to be directed into one of said first plurality of conduits, said first flow of fluid causing said spool valve to open to allow fluid communication between a source of hydraulic pressure and an inlet of said actuator, whereby said actuator moves said rod between said first and second position.

5. The servo actuator of claim 4, wherein:

when said torque motor produces a first force substantially equal to zero, said second force and said third force cooperate to produce a net force capable of deflecting said Jet pipe to cause said actuator to move to a predetermined position;

6. The servo actuator of claim 5, wherein:

said second spring is adjustable such that when said first force is substantially equal to zero, said second force and said third force cooperate to deflect said jet pipe to cause said actuator to move to one of a plurality of predetermined positions.

7. The servo actuator of claim 6, further comprising:

a motor operatively attached to said second spring for providing motor-driven adjustment thereof.

* * * * *